United States Patent [19]

Lachman et al.

[11] Patent Number: 5,260,035

[45] Date of Patent: Nov. 9, 1993

[54] APPARATUS AND METHOD FOR MODIFYING GASEOUS MIXTURES

[75] Inventors: Irwin M. Lachman; Mallanagouda D. Patil, both of Corning, N.Y.

[73] Assignee: Corning Incorporated, Corning, N.Y.

[21] Appl. No.: 925,020

[22] Filed: Aug. 5, 1992

[51] Int. Cl.$^5$ .................... B01D 50/00; B01D 24/00
[52] U.S. Cl. .................... 422/180; 422/168; 422/171; 422/177; 55/523; 55/524; 55/DIG. 5; 55/DIG. 30
[58] Field of Search ............... 422/168, 180, 181, 171, 422/177, 178, 179; 55/523, 524, 529, DIG. 5, DIG. 30; 210/510; 428/117, 118

[56] References Cited

U.S. PATENT DOCUMENTS

| | | |
|---|---|---|
| 3,647,542 | 3/1972 | Berger . |
| 3,885,977 | 5/1975 | Lachman et al. . |
| 4,127,691 | 11/1978 | Frost . |
| 4,363,644 | 12/1982 | Sato et al. ............... 55/523 |
| 4,364,760 | 12/1982 | Higuchi et al. ............ 55/523 |
| 4,416,676 | 11/1983 | Montierth ............... 55/523 |
| 4,417,908 | 11/1983 | Pitcher, Jr. ............. 55/523 |
| 4,420,316 | 12/1983 | Frost et al. ............. 55/523 |
| 4,428,758 | 1/1984 | Montierth ............... 55/523 |
| 4,451,517 | 5/1984 | Inoguchi et al. .......... 428/116 |
| 4,758,272 | 7/1988 | Pierotti et al. . |
| 4,800,187 | 1/1989 | Lachman et al. . |
| 4,985,210 | 1/1991 | Minami . |
| 4,992,233 | 2/1991 | Swaroop et al. . |
| 5,078,979 | 1/1992 | Dunne . |
| 5,125,231 | 6/1992 | Patil et al. . |

FOREIGN PATENT DOCUMENTS

0086367 4/1986 European Pat. Off. .

Primary Examiner—Robert J. Warden
Assistant Examiner—Christopher Y. Kim
Attorney, Agent, or Firm—L. Rita Quatrini

[57] ABSTRACT

An apparatus, system and method are disclosed for modifying a gaseous mixture. The apparatus comprises a unitary body having an inlet end, an outlet end, and a multiplicity of cells extending from inlet end to outlet end, the cells being separated from one another by porous walls, and filler material comprising electrically non-conducting active powder material, loaded into at least part of the volume of the cells, with some of the cells being unloaded and open, wherein a gaseous mixture enters the body at the inlet end through the open cells, and at least some of the gaseous mixture passes through the porous walls and is compositionally modified by the active material, and thereafter the resultant modified mixture passes through the open cells and exits the body at the outlet end. The apparatus can be used in conjunction with other apparatuses which are catalyzed to form a gas modifying system. The apparatus and system are especially suited for conversion of hydrocarbons, $NO_x$, and CO as from auto exhaust, and for Denox applications.

22 Claims, 4 Drawing Sheets

APPARATUS AND METHOD FOR MODIFYING GASEOUS MIXTURES

This invention relates to an apparatus, system, and method for modifying gaseous mixtures. The apparatus is made of a unitary body having a multiplicity of cells with porous walls between adjacent cells. A portion of the cells are filled with electrically non-conducting active material which is preferably catalyst and/or sorbing material. More particularly, the apparatus and method are designed for adsorption of hydrocarbons and the conversion of pollutants such as $NO_x$, CO and hydrocarbons as from auto exhaust, to innocuous products. The apparatus and method are suitable for conversion of $NO_x$ by reacting $NO_x$ with ammonia to produce innocuous products.

BACKGROUND OF THE INVENTION

Substances which are harmful to the environment are produced in combustion processes such as for example, fossil fuel power plants, internal combustion engines, gas turbines, and the like.

Internal combustion engines emit a large amount of unburned hydrocarbons and carbon monoxide during cold engine start-up. Release of hydrocarbons after starting an engine poses a special problem because at this point the exhaust gas temperature is not high enough for conversion to innocuous products to take place in the presence of conventional catalysts. Also, at start-up, the quantity of undesirable pollutants, especially hydrocarbons is at least an order of magnitude greater than after warm-up.

The catalysts utilized in catalytic converter systems are generally ineffective at ambient temperature and must reach high temperatures, often in the range of 300° to 400° C., before they are activated. Typically, the temperature of the catalyst is elevated by contacting it with the high temperature exhaust gases from the engine. Continuous contact with those gases and the exothermic nature of the oxidation reactions occurring at the catalyst, combine to raise the temperature of the catalyst and then maintain it at an elevated temperature.

Some methods of reducing cold start emissions which are practiced in the art are:

(1) locating the main catalyst or an auxiliary catalyst, referred to as a light-off catalyst close to the engine, (2) use of electrically heated catalyst systems, and (3) temporarily adsorbing hydrocarbons on zeolites and/or activated carbon wherein the zeolites are in the form of conventional pellets, beads or as washcoats on honeycombs.

There are disadvantages associated with each of these systems.

Placing the catalytic converter as close to the engine as physically possible is recommended to minimize the emission of pollutants during initial engine start-up because the closer the catalyst is to the engine, the hotter will be the exhaust gas when it contacts the catalyst and the more quickly the temperature of the catalyst will be raised to operating level. However, due to limitations of space in most vehicles, locating the total amount of catalyst in the system near the engine is difficult.

Heated catalyst systems, while effective in reducing hydrocarbons and carbon monoxide emissions, require a larger power supply and add additional weight. Furthermore, this would increase costs and cause unacceptable delays before the engine could be started with the assurance that undesirable pollution of the atmosphere would not occur.

Zeolite adsorption systems can reduce hydrocarbon emissions. Typically zeolites are crystallized as powders, formed into pellets, or zeolite powder may be embedded in or coated on porous ceramic pellets or beads, or the zeolite may be extruded into a porous structure, or embedded or coated on monolith ceramic substrates, or crystallized on the surface of a ceramic substrate. The present methods of utilizing zeolites have disadvantages. For example, in some methods such as coating, the amount of zeolite that can be coated on a substrate is limited by the surface area of the substrate. Under certain conditions, the coating is susceptible to attrition by abrasion. In order to increase the amount of zeolite, additional parts would have to be included in the catalyst system to hold relatively large quantities of zeolite, such as having the zeolite in a fixed bed through which the mixture to be converted passes. In the latter case, by-pass valving is needed, as discussed in U.S. Pat. No. 4,985,210. Bead/pellet reactors have large back pressures. Extruded monoliths of adsorbent material are not necessarily thermal shock resistant and are weaker than, for example, cordierite, which is the ceramic material usually used for coated substrates.

U.S. Pat. No. 4,985,210 relates to an exhaust gas purifying apparatus which employs zeolites for adsorbing harmful components in exhaust gas disposed at the upstream side of a catalytic converter so that when the exhaust gas temperature is not higher than a specific temperature, a harmful component is adsorbed by the adsorbent, and when the exhaust gas temperature exceeds the specific temperature, the harmful component desorbs from the adsorbent and is introduced into the catalytic converter. The system has additionally, activated carbon and a bypass in parallel, upstream of the adsorbent so that flow paths of exhaust gas are selectively switched from one to the other according to the temperature of the exhaust gas.

U.S. Pat. No. 5,078,979 relates to a process for treating an exhaust gas stream from an engine, especially during cold start. The process involves a molecular sieve bed over which the cold exhaust is flowed before flowing over a catalyst bed. Pollutants as hydrocarbons are adsorbed on the molecular sieve bed. When the molecular sieve bed reaches a temperature of about 150° C., the pollutants are desorbed from the adsorbent bed and converted by the catalyst to innocuous compounds.

Oxides of nitrogen, commonly called $NO_x$ gases are troublesome type of pollutant because they produce acid rain.

Up to the present time, $NO_x$ emissions in automotive and stationary power plants have been controlled by reducing them to nitrogen by three way catalysts (TWC) such as [Pt and/or Pd with Rh]/$CeO_2$-$Al_2O_3$ and selective catalytic reduction (SCR) with ammonia using a catalyst such as $V_2O_5$/$TiO_2$ or [Fe,Cu, etc]-zeolite.

The catalyst can be utilized in various forms depending on the application and size and geometry of the system as discussed previously. In selective reduction applications, which are high dust applications, the coating and extruded SCR catalysts are susceptible to attrition by abrasion.

As the public's attention to the problem of air pollution grows, government emission standards are being made increasingly more restrictive. There remains a need for reducing the amounts of pollutants introduced into the atmosphere.

It would be an advancement in the art therefore, to have an apparatus and method for efficiently converting auto exhaust pollutants and stationary power plant $NO_x$ to innocuous products without any of the above described disadvantages.

SUMMARY OF THE INVENTION

In accordance with one aspect of the invention there is provided an apparatus for modifying a gaseous mixture, the apparatus comprising a unitary body having an inlet end, an outlet end, and a multiplicity of cells extending from inlet end to outlet end, the cells being separated from one another by porous walls, and filler material comprising electrically non-conducting active powder material, loaded into at least part of the volume of the cells, with some of the cells being unloaded and open, wherein a gaseous mixture enters the body at the inlet end through the open cells, and at least some of the gaseous mixture passes through the porous walls and is compositionally modified by the active material, and thereafter the resultant modified mixture passes through the open cells and exits the body at the outlet end.

In accordance with another aspect of the invention, there is provided a system for modifying a gaseous mixture comprising a first apparatus as described above, and a second apparatus located downstream of the first apparatus, and comprising a unitary body having an inlet end, an outlet end, and a multiplicity of cells extending from inlet end to outlet end, the second apparatus body having a catalyst, whereby the modified mixture exiting the first apparatus body, enters the second apparatus body at the inlet end, is further modified by the second apparatus catalyst, and thereafter the resultant further modified mixture exits the second apparatus at the outlet end.

In accordance with still another aspect of the invention, there is provided a method for modifying a gaseous mixture, which comprises providing one apparatus as described above, passing a gaseous mixture into the at least one apparatus at the inlet end through the open cells, wherein at least part of the gaseous mixture passes through the porous walls to the loaded cells, to undergo compositional modification by the active material, whereby a modified mixture is produced, and passing the modified mixture through the open cells and through the outlet end of the body.

DETAILED DESCRIPTION OF THE INVENTION

This invention provides an apparatus, system, and method for modifying gaseous mixtures. Although the mixtures are gaseous, the mixtures can have minor amounts of liquid phases, such as water droplets, or some particulate matter.

The apparatus, system and method are especially suited for hydrocarbon conversion but can be used in DENOX and conceivably in DESOX applications.

The apparatus is made of a unitary body having an inlet end, an outlet end, and a multiplicity of cells extending from inlet end to outlet end and porous walls between and separating adjacent cells from one another. Filler material is loaded into at least part of the volume of the cells. This means that of the total number of cells, some cells have filler material and some have no filler material. Those having no filler material are termed unloaded or open. Generally, for a given loaded cell, at least about 25% of its volume is filled. It is preferred that the filler material substantially fill, and most preferably, completely fill the cells designated to hold the filler material. As a general rule for the present invention, a cell is considered to be substantially filled when at least about half of its volume is filled. A cell is considered to be completely filled when it contains as much material that can be loaded into it by practical means, such as for example, by hydraulic injection. As a general rule, a given loaded cell is considered to be completely filled when at least about 80% of its volume is loaded with filler material. Having material filling the cells differs from washcoating the cell walls with the same material because the filler is distributed such as to prevent unimpeded flow thru. In this type of distribution, voids are distributed more or less randomly. These voids can be relatively large depending on the amount of filler material. A larger void may have a diameter almost as large as the cell diameter. These are referred to as macropores. Some of such void space is desirable in the filled cells in order to facilitate mass transfer of gases therethrough. Even when a cell is substantially filled with powder material, it has a void space of about 50% which is generally microporous. Good packing can reduce the void space to about 25% (about 75% filled). This predominately microporous void space is therefore to be distinguished from the macroporous space when referring to the amount of cell filler.

It is preferred that each of the filled cells neighbor at least one open cell. It is especially preferred that the filled cells alternate with the open cells (so that about half of the cells contain filler material) to allow the most efficient passage of gaseous mixtures therethrough. It is preferred that all the cells run in the same direction. However, cross flow configurations are also possible.

The filler material comprises electrically non-conducting active powder material. The powder material can be loaded into the cells in any convenient handleable form such as in the form of a paste, but which can harden on heat treatment. By active material is meant material which can modify a gaseous mixture, by reaction with the mixture components, by catalytic activity, or by sorbing activity, or desorbing activity. The active material is preferably sorbing material and/or catalytic material. The sorbing material or sorbing agents take up and hold substances by either absorption or adsorption. In the practice of the present invention, a sorbing agent is present in the filler material to take up or remove selected constituents from a gaseous mixture under certain conditions. These constituents can then desorb under certain conditions which are predetermined. The term "sorbing material" or "sorbing agent" as used in the present invention can mean one or a plurality of sorbing agents. Adsorption is the taking up of molecules by physical or chemical forces, termed respectively, physical or chemical adsorption. The term "adsorbing agent" according to the present invention means at least one adsorbing agent. There can be more than one type of adsorbing agent in the filler material. The specific adsorbers can vary depending on the application. Catalyst material according to the present invention is a highly dispersed catalyst metal or catalyst metal oxide on a support. Catalyst material includes also molecular sieves, such as zeolites when used in conversions such as, e.g., in cracking of hydrocarbons or oxidation, etc.

Depending on the application, the walls of the open cells can have active material incorporated therein or thereon, such as catalysts; or they can have no material.

The apparatus of the present invention can be used in any application in which a gaseous mixture, flows through the open cells and is modified by the active material as described.

More than one filled cell apparatus can be used to form a gaseous mixture modifying system. For example, the most typical arrangement is to have all their cells running in the same direction and be placed in sequence so that gases flow from one to the other to undergo respective modifications. However, cross flow reactors can be used in multiple reactor systems also.

The filled cell apparatus can be used with one or more totally open celled apparatus to form a gaseous mixture modifying system. Here again the apparatuses can have all their cells running in the same direction and be placed in sequence so that gases flow from one to the other. For example, a multi-reactor system can have the filled cell apparatus located upstream or downstream of a totally open celled apparatus, so that a gaseous mixture passes sequentially through the inlet and outlet ends of the apparatuses to undergo modification.

The reactor is especially suited for use in conversion of auto exhaust gas, i.e., $NO_x$, CO, and hydrocarbons to innocuous products, using suitable adsorbing agents and catalysts.

By innocuous products according to the present invention is meant those that are generally considered to be harmless to health and the environment, such as $CO_2$, $N_2$, $H_2$, and water.

Another suitable use for the apparatus is as a reactor for reacting $NO_x$ with ammonia to produce innocuous products.

Figures 1, 2:
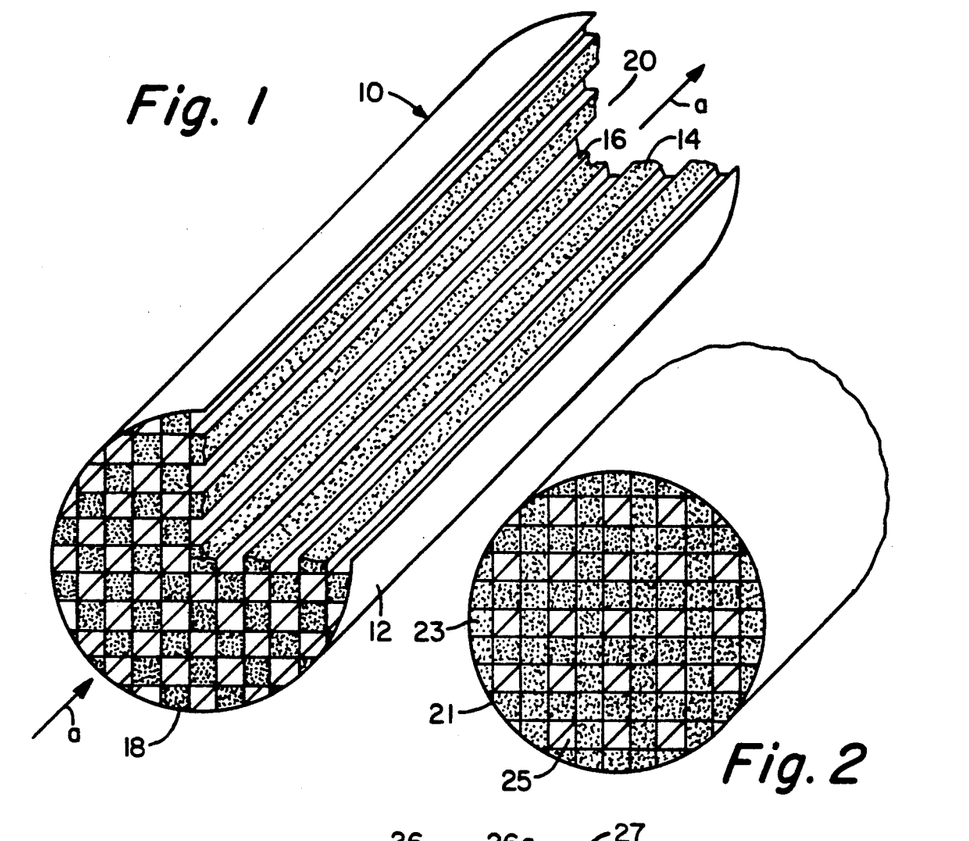
FIG. 1 is a schematic diagram showing an apparatus of the present invention with the cells alternately filled with filler material.
FIG. 2 is a schematic diagram showing an end plan view of an apparatus of the present invention with about 75% of the cells filled with filler material.

FIG. 1 shows a typical apparatus of the present invention The apparatus (10) is made of a unitary body (12) which is shown as a honeycomb structure. The filler material (14) fills alternate cells of the honeycomb. The open cells are shown as (16). The arrows show a unidirectional flow of a gaseous mixture into the apparatus through the inlet end (18) and the flow of the resultant output passes through the outlet end (20) to exit the apparatus.

FIG. 2 shows an end plan view of an apparatus of the present invention (21) in which approximately 75% of the cells are filled (23) and 25% are unfilled (25). A larger number of filled cells as shown in FIG. 2, can be used in applications in which a higher space velocity is used.

Figure 3A:
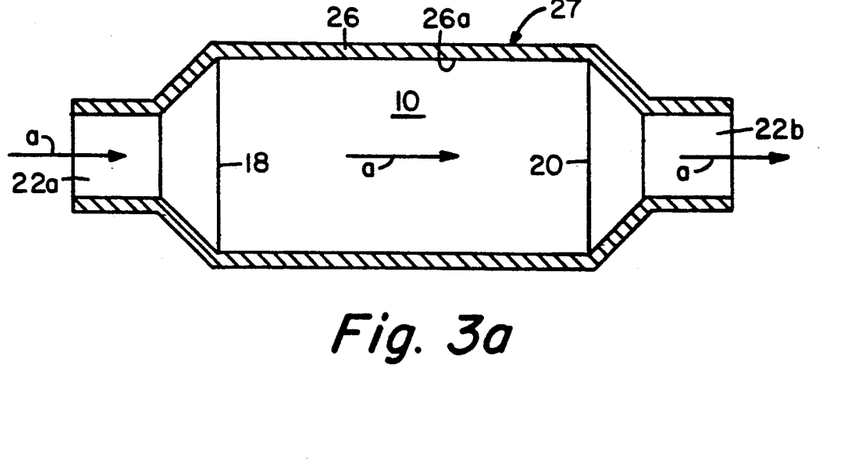
FIG. 3a is schematic diagram showing a single apparatus and a conduit system.

FIG. 3a is a schematic diagram showing the apparatus and a conduit system (27), the conduit system being represented by (22a) and (22b). First conduit (22a) is connected to the inlet end (18) of the apparatus (10). Arrows indicate the direction of flow through the apparatus. A gaseous mixture enters the inlet end of the apparatus through the first conduit to the open cells. At least some of the gaseous mixture passes through the porous walls of the body to the filled cells to undergo modification by the active powder material. Thereafter, the output from the reactions in the filled cells passes through the porous walls to the open cells. The mixture in the open cells which is the output from the filled cells and any output from reactions taking place in the open cells by catalysts therein, or any unreacted material, passes to the outlet end, and exits the reactor as the modified mixture, through second conduit (22b) which is connected to the outlet end (20) of the reactor. The resultant modified mixture is conveyed from the outlet end of the reactor through the second conduit to exit the reactor.

Figure 3B:
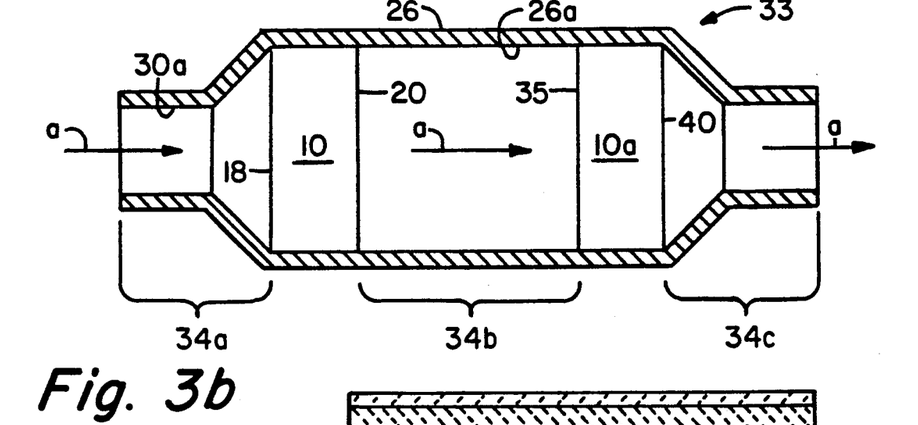
FIG. 3b is a schematic diagram showing two apparatuses and a conduit system.

FIG. 3b shows a reaction system (33) using two apparatuses: a loaded cell reactor upstream (10) and another reactor downstream (10a), and a conduit system represented by (34a), (34b), and (34c). First conduit (34a) is connected to the inlet end (18) of the upstream reactor. Second conduit (34b) is connected to the outlet end (20) of the upstream reactor and inlet end (35) of the downstream reactor. Third conduit (34c) is connected at one end to the outlet end (40) of the downstream reactor. Arrows (a) indicate the direction of flow of a stream through the conduits and reactors. A reactant stream enters upstream reactor through the first conduit, undergoes modification, the output of the upstream reactor exits that reactor through the second conduit and enters the downstream reactor through the second conduit, is further modified in the downstream reactor, and the output from the downstream reactor exits that reactor through the third conduit. No additional valving is needed to accomplish the modification. The reactors are shown in a conventional canister as is used in automotive applications with the various sections of the canister serving as the respective conduits. In this application, the downstream reactor is the main body converter.

It is to be understood that the respective conduits can be connected to the respective units by any means known in the art. It is to be understood also that respective sizes and lengths of the conduits and units can vary depending on the application and that the invention is not limited to any sizes or size relationships of conduits and apparatuses. FIGS. 3a and 3b show the units in a conventional canister or can shown as (26) with the inner surface shown as 26a, as is used in automotive applications. The units are held fixed in the canister by conventional means such as, for example, by metal mesh, or ceramic mats, etc. Refractory fibrous material is often used to prevent passage of gases between the unit and the canister. The various sections of the can serve as the respective conduits, and for the purposes of the present invention, are considered to be connected to the reactor.

The unitary body is made of material that is suitable preferably for high temperature applications. Some preferred materials are those that include as a predominant phase: ceramic, glass-ceramic, glass, high surface area high temperature stable oxides, metals, and combinations thereof. By combinations is meant physical or chemical combinations, e.g., mixtures or composites. Some materials that are especially suited to the practice of the present invention, although it is to be understood that the invention is not limited to these, are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. Some typical ceramic substrates are disclosed in U.S. Pat. Nos. 4,127,691 and 3,885,977. Those patents are herein incorporated by reference as filed. Other types of bodies are porous metal bodies. Some preferred types of porous metal bodies, although it is to be understood that the invention is not limited to such, are bodies made of iron group metals such as, for example, Fe-Al or Fe-Cr-Al with optional additions for enhancement of various properties. For example, additions of oxides are included for enhancement of properties such as heat, corrosion, oxidation resistance, etc. Some porous metal bodies which are especially suited to the practice of the present invention are discussed in U.S. Pat. Nos. 4,758,272 and 4,992,233 and in U.S. patent application No. 07/767,889, filed Sep. 30, 1991 (European patent application publication no. 488716A1). These patents and application are herein incorporated by reference as filed. Electrically heatable substrates can also be used, if it is deemed feasible to use such substrates.

The unitary body can be of any size and shape suitable to the application. Preferred substrates are honeycomb structures.

Some examples of honeycombs produced by the process of the present invention, although it is to be understood that the invention is not limited to these, are those having about 94 cells/cm$^2$, (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or about 15 cells/cm$^2$ (about 100 cells/in$^2$), or about 2.5 cells/cm$^2$, (about 16 cells/in$^2$) or about 1.5 cells/cm$^2$ (about 9 cells/in$^2$). These bodies are made preferably of, but not limited, to materials which when fired form cordierite. Typical wall thicknesses in catalytic converter applications, for example, are about 6 mils (about 0.15 mm) for 400 cells/in$^2$ (62 cells/cm$^2$) honeycombs. Wall thicknesses range typically from about 4 to about 25 mils (about 0.1 to about 0.6 mm). The external size and shape of the body is controlled by the application, e.g. engine size and space available for mounting, power plant configuration, etc.

The body can have any degree of wall porosity from low to high. For example, typically the wall porosity ranges from about 1% by volume to higher values which are determined by practical limits depending on the composition of the substrate and the intended application, eg, nature of the material which is to be coated on the walls of the open cells, etc. The porosity is typically about 30% to about 70% by volume. The invention is especially suited for low-to-moderate porosity bodies, that is, those having total porosities of about 30% to about 50% by volume.

The pore size is large enough to allow through passage of reactants and products, eg., gas molecules that are to pass through the walls and be adsorbed, but small enough to prevent the loss of filler material from the filled cells. In general, the average pore size is about 2 to 70, and preferably about 10 to 50 microns in diameter for most applications.

The filler material can be made by mixing the active components with other components such as temporary and/or permanent binders, rheological agents, and vehicles, depending on the application.

The filler material is such that it becomes a porous hard material after exposure to heat. Permanent binders or precursors such as aluminum nitrate, boehmite, etc. are added for this purpose, so that powder will not blow out of the cells.

The filler material can be introduced into the cells in any way convenient for filling cells with powder material. One especially preferred technique for loading honeycombs with zeolite containing material is to use bodies which have alternate cells plugged at one end. In this technique, the cells or channels which are not to be filled are plugged at one end. This can be done by any known technique. In one technique a mask usually of rubber, is used. The mask has openings to match the cell number and size of the cells of the body. One set of openings are blocked by the rubber mask in the pattern that is contemplated for the cells which are to be subsequently loaded. The mask is placed on one end of the body and the cells of the body not blocked by the mask are plugged with plugging material. The plugging material is typically a low firing ceramic composition but can be any type of cementicious or polymer type material which after heat treatment or curing is inert to the filling operation. The mask is then removed and the body is heat treated or cured and is then ready to be loaded with filler material. One preferred technique for loading the cells of the body is to introduce a mixture of the desired composition of filler material which is typically in the form of a paste, into the end of the body which has plugged cells exposed to the paste. Filling of the cells is accomplished by pushing the appropriate amount of paste material into the unplugged cells with a hydraulic press. If necessary, the loaded body is then dried and fired to remove liquid phases, fugitive additions such as temporary binders and rheological agents. The plugging is then removed, such as by sawing it off. If polymers are used as the plugging material, the plugs are burned off.

With the above techniques having been described, it is to be understood that any convenient technique can be used to introduce filler material into the desired cells in the body without departing from the scope of the present invention, and the invention is not limited to any specific technique for accomplishing the same.

If the open cells have active material, the material can be incorporated thereon or therein by methods known in the art such as by washcoating, spraying, etc.

In accordance with a preferred embodiment, the reactor is designed for hydrocarbon adsorption and cracking, such as clean-up of gas streams which are contaminated with hydrocarbons, and the conversion of pollutants such as $NO_x$ CO, and hydrocarbons as from auto exhaust, to innocuous products.

Examples of hydrocarbons, although it is to be understood that the invention is not limited to these, are low molecular weight or light hydrocarbons found in gasoline and diesel fuel, alcohols and their products of combustion and molecular rearrangements. Alkanes and alkenes with 1 to 6 carbon atoms are considered to be low molecular weight hydrocarbons. Some examples are ethylene, propylene, butadiene, pentene, and other unsaturated hydrocarbons. The exhaust gas mixture contains typically about 2500 to 10000 volume ppm of hydrocarbons during the initial start-up period which is typically less than about 5 minutes, but this can vary. The adsorbing agent(s) is suitable for adsorbing hydrocarbons. In this embodiment, the pollutants which are predominately hydrocarbons at low temperature pass through the open cells and through the porous walls to the filled cells and are adsorbed by the adsorbing agent. The degree of adsorption depends on conditions as amount and type of adsorbing agent or adsorbing agents, amount and chemistry of the hydrocarbons, the temperature, design of the apparatus, e.g., cell path length, etc. Preferably, the filled cells can include catalysts in addition to the adsorbing agent. Most typically, the filled cell catalyst is predominately for converting hydrocarbons, e.g., by oxidation to innocuous products, and also for cracking. Some filled cell catalysts that are especially suited to the practice of the present invention are transition metals having atomic numbers 21 thru 79, noble metals, eg, Pt, Pd, and Rh, on supports such as oxides, eg, alumina, silica, zirconia, titania, rare earth oxides such as ceria and lanthana, or incorporated into molecular sieves as described previously, or any combinations of these components.

At higher temperatures, e.g., engine operating temperature, the pollutants which are generated, that is, $NO_x$, CO, and hydrocarbons, pass through the open cells. The open cells can have a catalyst for conversion of $NO_x$, CO, and hydrocarbons to innocuous products. At the same time, the adsorbed hydrocarbons or cracking products from filled cell reactions, desorb and pass through the walls to the open cells to undergo conversion to innocuous products in the presence of a catalyst on the walls of the open cells.

In auto exhaust conversion applications, the reactor with hydrocarbon adsorbers can be placed upstream as the first apparatus and a conventional the main catalytic converter or underbody catalyst is placed downstream as the second apparatus. The exhaust gases pass from upstream to downstream reactor as described previously and shown in FIG. 3b. At auto engine start-up, hydrocarbon adsorption and possible oxidation and cracking take place in the adsorbent-loaded cells as previously described. At engine operating temperature, as the exhaust gas containing $NO_x$, CO, and hydrocarbons passes through the two reactors in turn, the higher temperature of this second stream of exhaust gas raises the temperature of both reactors so that in the main converter, the catalyst is up to operating temperature and converts the $NO_x$, CO, and hydrocarbons to innocuous products. At the same time, the adsorbed hydrocarbons and cracking products from the filled cell reactions, desorb from the heated loaded cell reactor and pass from the loaded cell reactor to the main converter for oxidation.

One advantage of having the adsorbing agent filling the cells of the unit rather than being coated on the walls of the cells as in conventional reactors, is that a larger amount of active material (adsorbing agent and/or catalyst) can be introduced into the system without introducing a separate bed of active material. Another advantage of using filled cells over coating is in elimination of attrition due to abrasion in high dust applications, as in SCR applications. One advantage of having the adsorbing agent filling the cells rather than having a separate bed for containing the adsorbing agent is that no valving is needed to direct the exhaust gases or to accommodate temperature fluctuations which affect the efficiency of temperature sensitive adsorbing agents and catalysts. Another advantage is that a temperature gradient is created in the filled cells from wall of the filled cell to the center of the filled cell and from the inlet (upstream) end to outlet (downstream) end. For example, during operation of an automobile, as the engine warms up, the temperature of the exhaust gases and the reactor increases. As this happens, the adsorbed hydrocarbons desorb. If the temperature of the adsorbing agent increases before the conversion catalyst warms up, as is often the case with adsorbing material coated on the walls of the cells, the hydrocarbons can exit the reactor unconverted, thus causing pollution to the atmosphere. However, when the cells are filled with adsorbing agent, the temperature differential between the adsorbing agent in the filled cells and the other parts of the reactor and the reactant mixture is sufficient so that the adsorbed and cracked hydrocarbons remain adsorbed longer. Enough time, therefore, is allowed for the conversion catalyst or catalysts to warm up to operating temperature. This applies to catalysts that are located in the filled cell reactor or in an additional reactor such as a main body catalytic converter.

Figure 4:
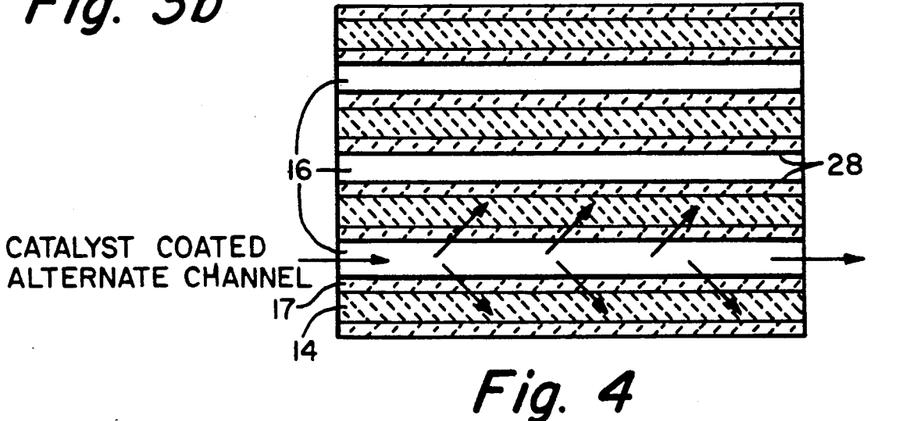
FIG. 4 is a schematic diagram showing adsorption taking place in the filled cells of an apparatus of the present invention.
Figure 5:
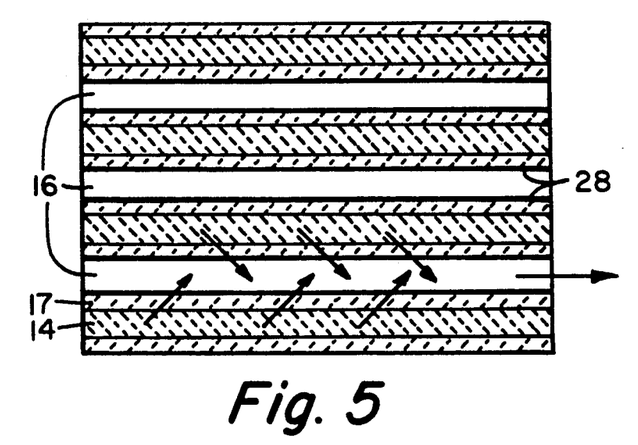
FIG. 5 is a schematic diagram showing an desorption taking place in the filled cells of an apparatus of the present invention.

FIGS. 4 and 5 are schematic diagrams showing cells of a unitary body of the reactor of the present invention which are alternately filled with adsorbing agent in an adsorption-desorption application such as in conversion of $NO_x$, CO, and hydrocarbons in auto exhaust. Arrows indicate the flow of material. On start-up of the engine, the exhaust gases flow through the open cells (16) as shown in FIG. 4. The open cells are coated with a catalyst (28), which is most preferably a three-way catalyst. During this flow, hydrocarbons diffuse through the porous walls (17) and are adsorbed by the adsorbing agent (14) in the neighboring channels. By virtue of the fact that the adsorbing agent is loaded in the cells, the thermal mass and position of the adsorbing agent shield it from immediate exposure to the temperature of the exhaust gas as would happen if the adsorbing agent were coated on the walls of the cells. Therefore, the temperature of the adsorbing agent is lower compared to the catalyst in the open cells. Therefore the hydrocarbons are retained by the adsorbing agent long enough for the catalyst to reach operating temperature, and they do not prematurely desorb. At engine operating temperature, the exhaust gas temperature increases and, the adsorbed hydrocarbons desorb and oxidize over the catalyst coated on the open cells (16) as shown in FIG. 5. The pollutants in the exhaust gases are converted to innocuous products over the catalyst coating the open cells. At steady state the temperature of the adsorbing agent is close to that of the catalyst on the walls of the open cells.

Some typical adsorbing agents that are suited for removal of hydrocarbons are those that adsorb at relatively low temperatures and desorb at relatively high temperatures. For example, adsorbing agents that adsorb hydrocarbons at engine start-up temperatures which are typically less than about 150° C., and desorb at engine operating temperatures which are typically greater than about 150° C. are especially suited to the practice of the present invention.

Some typical adsorbing agents which are especially suited to the practice of the present invention are molecular sieves, activated carbon, transition aluminas, activated silicas, and combinations of these. The preferred adsorbing agents are molecular sieves, activated carbon, and combinations of these.

Molecular sieves are crystalline substances having pores of size suitable for adsorbing molecules.

Some types of molecular sieves which are preferred for the practice of the present invention are carbon molecular sieves, zeolites, aluminophosphates, metallophosphates, silicoaluminophosphates, and combinations of these.

Carbon molecular sieves have well defined micropores made out of carbon material.

Some preferred zeolites are faujasite type, especially preferred of which is ultra stable Y, preferably with $SiO_2/Al_2O_3$ mole ratios of greater than about 5, pentasil type, preferred of which are ZSM type such as ZSM-5 most preferred of which have $SiO_2/Al_2O_3$ mole ratios of greater than about 25, and mordenite, and beta, and combinations of these.

Depending on the silica/alumina ratio, zeolites can have mainly physical adsorption or a combination of physical and chemical adsorption. In physical adsorption, the adsorbents weakly hold the adsorbed species within or on their structure. Species that are physically adsorbed, desorb at relatively low temperatures, e.g., room temperature. In chemical adsorption, the adsorbents strongly hold the adsorbed species within their structure. Species that are chemically adsorbed, desorb at relatively high temperatures i.e., typically above room temperature. (Low and high temperatures are strictly relative terms).

A zeolite can be used as formed or ammoniated, but is preferably in the H+ form, or ion exchanged with an alkali or alkaline earth metal but preferably with a transition metal, e.g. of atomic number 21 thru 79, as a noble metal, eg., Pt or Pd, etc., as is known in the art depending on the adsorption or conversions which are desired.

In the conversion of auto exhaust, some especially suited catalysts that can be included as active material in the filler material are noble metal oxidation catalysts such as Pt and/or Pd with a support such as alumina, ceria, titania, lanthana, zirconia etc. Alternately or additionally, the oxidation catalyst can be a noble metal such as Pt and/or Pd ion exchanged or adsorbed into a molecular sieve such as a zeolite. In this case, the molecular sieve or zeolite can function also as the adsorbing agent. The oxidation catalyst serves to oxidize the hydrocarbons mainly, to innocuous products as carbon dioxide and water, which are suitable for passing into the atmosphere.

The adsorbing agent is typically mixed with a binder and plasticizer. Some preferred binders are aluminum oxide most preferred of which is the precursor boehmite, other precursors of aluminum oxide, eg., aluminum nitrate, and silica, titania, zirconia, rare earth oxides, e.g., ceria, etc, and their precursors. A preferred binder and plasticizer is methylcellulose. A vehicle is used to attain the proper plasticity, viscosity and for handling and filling. One preferred vehicle is water. Additionally any catalysts which are to be included with the filler material can be first prepared separately eg., combining metal(s) and support material(s), as is known in the art, and then mixed in.

Some typical compositions that can be used for hydrocarbon adsorption are in percent by weight 0 to about 50 methylcellulose, 0 to about 50 silica, 0 to about 50 $Al^2O_3$ from boehmite, aluminum nitrate, or alumina sol, and about 50 to about 90 of the adsorbing agent, preferably zeolite. More preferred compositions are in percent by weight 0 to about 5 methylcellulose, 0 to about 10 silica, 0 to about 15 alumina from alumina sol, 0 to about 15 alumina from boehmite, and about 70 to about 90 of the adsorbing agent, preferably zeolite.

Unavoidable impurities can also be present in the compositions if they do not interact with the constituents of these compositions. However, impurities that cause sintering or destruction of the zeolite structure must be kept at low levels. Most typically, impurities should be kept below about 5 wt. %, preferably below about 1% and most preferably below about 0.01%.

Some especially preferred compositions are given in Table 1. In each case, the constituents or their precursors are blended with about 0.5 to about 2.0% methylcellulose (Dow A4M). A paste is formed in a suitable machine such as a mix-muller, double-arm mixer, or calender rolls by admixing with a liquid medium. The preferred medium is water, however, organic liquids in combination with water can be used, for example, isopropyl alcohol and water. Or organic liquids alone can be used, e.g., toluene or xylene.

TABLE 1

| WEIGHT PERCENT CONSTITUENTS OF FILLER COMPOSITIONS AFTER FINAL HEAT TREATMENT | | | | | | |
|---|---|---|---|---|---|---|
| Filler Constituent | A | B | C | D | E | F |
| ZSM-5 [$SiO_2/Al_2O_3$ = 26/1] | 85 | — | — | — | — | — |
| ZSM-5 [$SiO_2/Al_2O_3$ = 150/1] | — | 85 | — | — | — | — |
| ZSM-5 [$SiO_2/Al_2O_3$ = 280/1] | — | — | 90 | — | — | — |
| Ultra Stable Y [$SiO_2/Al_2O_3$ = 12.5/1] | — | — | — | 90 | — | — |
| Ultra Stable Y [$SiO_2/Al_2O_3$ = 200/1] | — | — | — | — | 93 | — |
| Mordenite [$SiO_2/Al_2O_2$ = 20/1] | — | — | — | — | — | 93 |
| Gamma Alumina [from Dispersal Boehmite, Condea Chemie] | 15 | — | 10 | — | — | — |
| Gamma Alumina [from Reagent Aluminum nitrate] | — | 15 | — | — | 7 | — |
| Silica [from DUPONT Ludox HS-40] | — | — | — | 10 | — | 7 |

In the conversion of auto exhaust, the open cells can have a catalyst known in the art for conversion of $NO_x$, CO, and hydrocarbons to innocuous products. Some preferred catalysts are for example, noble metal as e.g., Pt, Pd, Rh, or combinations thereof on alumina, ceria, lanthana, zirconia, yttria, or combinations thereof. It is especially preferred to use a three-way catalyst. Some typical three-way catalysts which are especially suited to the practice of the present invention for auto exhaust conversion are Pt on ceria-alumina combined with Rh on zirconia. The Pt-ceria-alumina and the Rh-zirconia can be combined and applied at once, as in a single coating or they can be applied in separate coatings. Another suitable catalyst is Pt/Pd/Rh on gamma alumina with a rare earth oxide such as ceria.

The filled cells can be filled with more than one type of adsorbing agent in a variety of arrangements depending on the application, composition of the reactant mixture and desired output. The types of adsorbing agents can vary within an individual cell or can vary from one filled cell to the other. For example, more than one adsorbing agent can be mixed into the filler material to form a single filler composition. Each individual cell can be filled with various compositions, each having a different adsorbing agent or set of adsorbing agents, depending on the application. For example, an individual filled cell can be filled in part of its volume with one composition that is, for example, containing one type of adsorbing agent, and have other compositions, with for example, other types of adsorbing agents filling other sections of the cell. The different types of adsorbing agents can alternately fill various sections of an individual cell. Still another arrangement is to have the type of adsorbing agents vary from one filled cell to another. As an example of one contemplated use, one section of the cell can have an adsorbing agent which adsorbs optimally at a specific temperature or optimally adsorbs one type of species, and another section can have an adsorbing agent which adsorbs optimally at a different temperature or optimally adsorbs another type of species. Or an adsorbing agent which adsorbs optimally at one temperature can fill part of the filled cells and an adsorbing agent that absorbs optimally at another temperature can fill the remaining part of the filled cells. Such arrangements are advantageous when a reactant mixture is expected to change in composition or temperature during operation or flow of a specific reactant mixture through the reactor. Having more than one adsorbing agent offers the advantage of greater flexibility in overall design of a reaction system. For example, when the reactor is used as part of a catalytic converter for auto exhaust, the configuration of filled and open cells and the type or types of adsorbing agents can be chosen to meet the specific size and space considerations of engine and exhaust system, and exhaust gas temperature and compositions.

The reactor is suited for converting $NO_x$ to innocuous products such as $N_2$. In this case, a $NO_x$ conversion catalyst is loaded as filler material into a portion of the cells as previously described.

$NO_x$ containing gaseous mixture is contacted with a catalyst for converting part of the $NO_x$ to ammonia. The catalyst can be any known catalyst for this conversion, for example, Pt and/or Pd on a refractory support as alumina, with or without a rare earth oxide as ceria. Thereafter the remaining $NO_x$ and ammonia are passed into the apparatus into the filled cells which contain a catalyst for converting the remaining $NO_x$ by reaction with the ammonia.

Another $NO_x$ conversion that is especially suited to the practice of the present invention is reacting $NO_x$ with ammonia to produce $N_2$ as in stationary powder plants. The ammonia is premixed with the $NO_x$-containing gas stream prior to being passed into the reactor. The ammonia-$NO_x$ mixture passes into the reactor into the filled cells for conversion to $N_2$ by the filled cell catalyst.

In the above applications the filled cell catalyst can be any known SCR catalyst such as zeolite-based catalysts having transition metal or metals ion exchanged. Some preferred catalysts are Fe mordenite, Cu mordenite, ZSM-5 H+ form, and $V_2O_5/TiO_2$.

Some typical compositions that can be used for SCR of $NO_x$ with $NH_3$ are in percent by weight 0 to about 50 methylcellulose, 0 to about 50 silica, 0 to about 50 aluminum nitrate, 0 to about 15 boehmite, and the balance being the Denox catalyst and unavoidable impurities. More preferred compositions are in percent by weight 0 to about 5 methylcellulose, 0 to about 10 silica, 0 to about 15 aluminum nitrate, 0 to about 15 boehmite, and the balance being the Denox catalyst and unavoidable, impurity levels being as described previously.

Some especially preferred compositions are given in Table 2. The constituents are mixed in the same manner as was described for the compositions for hydrocarbon adsorption.

TABLE 2

WEIGHT PERCENT CONSTITUENTS OF FILLER COMPOSITIONS AFTER FINAL HEAT TREATMENT

| Filler Constituent | G | H | I | J | K | L |
|---|---|---|---|---|---|---|
| Fe-Mordenite [3% $Fe_2O_3$, $SiO_2/Al_2O_3$ = 20/1] | 85 | — | — | — | — | — |
| Cu-Mordenite [3% CuO, $SiO_2/Al_2O_3$ = 20/1] | — | 85 | — | — | — | — |
| Fe-Mordenite [3% $Fe_2O_3$, $SiO_2/Al_2O_3$ = 20/1] | — | — | 90 | — | — | — |
| Cu-Mordenite [3% CuO, $SiO_2/Al_2O_3$ = 20/1] | — | — | — | 90 | — | — |
| 3% $V_2O_5$ + 97% $TiO_2$ | — | — | — | — | 93 | — |
| 3% $V_2O_5$ + 87% $TiO_2$ + 10% $WO_3$ | — | — | — | — | — | 93 |
| Gamma Alumina [from Dispersal Boehmite, Condea Chemie] | 15 | — | 10 | — | — | — |
| Gamma Alumina [from reagent grade Aluminum nitrate] | — | 15 | — | — | 7 | — |
| Silica [from DUPONT Ludox S-40] | — | — | — | 10 | — | 7 |

To more fully illustrate the invention, the following non-limiting examples are presented.

EXAMPLE 1

Inventive example showing hydrocarbon adsorption

Figure 6:
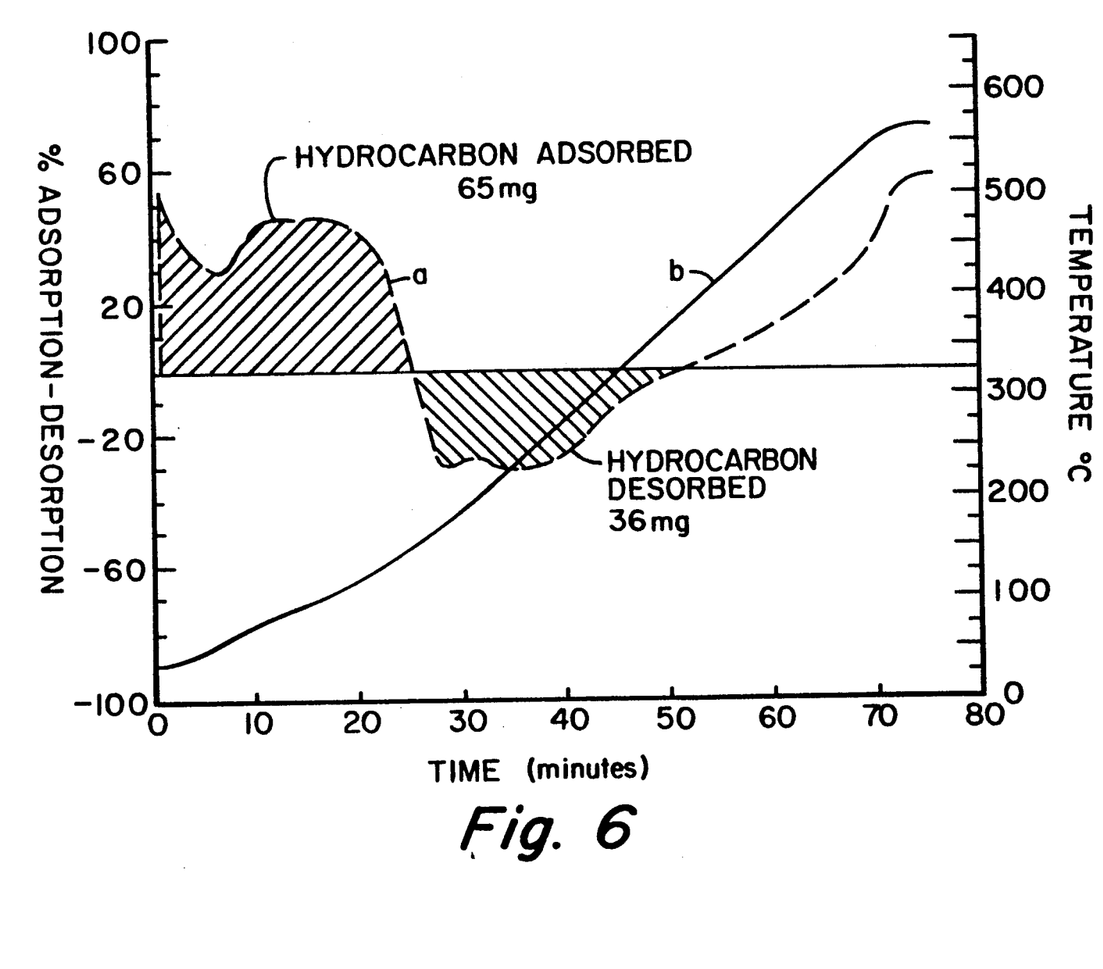
FIG. 6 is a plot of hydrocarbon adsorption-desorption pattern of a propylene-containing gas mixture versus time and temperature, with an apparatus, the cells of which are alternately filled with zeolite.

This example illustrates the preparation of zeolite loading in alternate cell or channels of a ceramic honeycomb body. On a dry basis the following mixture was prepared and blended: about 49% ZSM-5 zeolite (Conteka, CBV-1502, $SiO_2/Al_2O_3$ mole ratio of about 150), 8% boehmite alumina hydrate (Dispersal from Condea Chemie), 42% aluminum nitrate, reagent grade) and about 1% methylcellulose (Dow Chem.). Distilled water was added to the mixture to form a thick paste. The mixture was kneaded to a uniform consistency by hand mixing (or blender, mix muller, or mechanical stirrer). A ceramic honeycomb with alternate channels plugged at the ends measuring about 5.7" (about 14.5 cm) in diameter, about 6" (about 15.3 cm) long, and 100 cells per square inch, (15 cells/cm²), and 0.025" (0.06 cm) wall thickness, about 50% wall porosity, about 35 micron average pore diameter, was cut in half radially so that the two pieces had alternate channels that were blocked only on one side. One piece was placed with the plugged end up on the plate of a hydraulic press. The completely open end was elevated by placing the piece on three metal bars supporting the outside edge so that the open channels remained unblocked. A two inch diameter pill die was filled with the zeolite paste mixture and placed on top of the body at the center. The die plunger was placed into the opening of the die and the plunger was slowly pushed with the hydraulic press. When the zeolite and binder paste came out of the other end, indicating that the channels were fully loaded, pressing was stopped. Excess zeolite paste was removed from both sides. The resulting honeycomb with zeolite-loaded cells was dried at 60° C. for 6 hours followed by heat- treating at about 550° C. for 3 hours with ramp rate of about 2° C/min. After heat-treating, the original plugging was cut from the top end to form the alternately filled reactor body. A one inch (2.54 cm) diameter core was drilled and used for bench testing for hydrocarbon adsorption. On a fired basis, the weight ratio of zeolite to alumina binder was about 85/15. Two samples of size about 1" (2.54 cm)×2.25" (about 5.7 cm) length were made. One of these samples was tested in a bench test reactor for hydrocarbon adsorption using a simulated automotive gas mixture. The gas mixture consists of by volume about 1000 ppm $NO_x$, about 500 ppm propylene, about 1.0% CO, and the balance nitrogen and the A/F ratio being about 14.8. The hydrocarbon flow rate in the mixture is about 7.0 mg/min. The space velocity is about 50,000 volume changes/hr. Conversions of $NO_x$, CO, and hydrocarbons were measured as percent conversion compared to inlet concentrations. A computer automatically collected data. The temperature of the reactor was raised from about 30° C. to about 600° C. in an hour. After the run, hydrocarbon conversion, and temperature data were plotted as a function of time. By integrating the areas, the amount of hydrocarbon adsorbed and desorbed was calculated. A total of about 65 mg of hydrocarbon was adsorbed and of that 65 mg, about 36 mg was desorbed (about 55% was desorbed). Therefore, the 45% that was not desorbed was most likely decomposed by some cracking or oxidation. The results are shown in FIG. 6, (a) being percent adsorbed, and (b) being the temperature.

EXAMPLE 2

Figure 7:
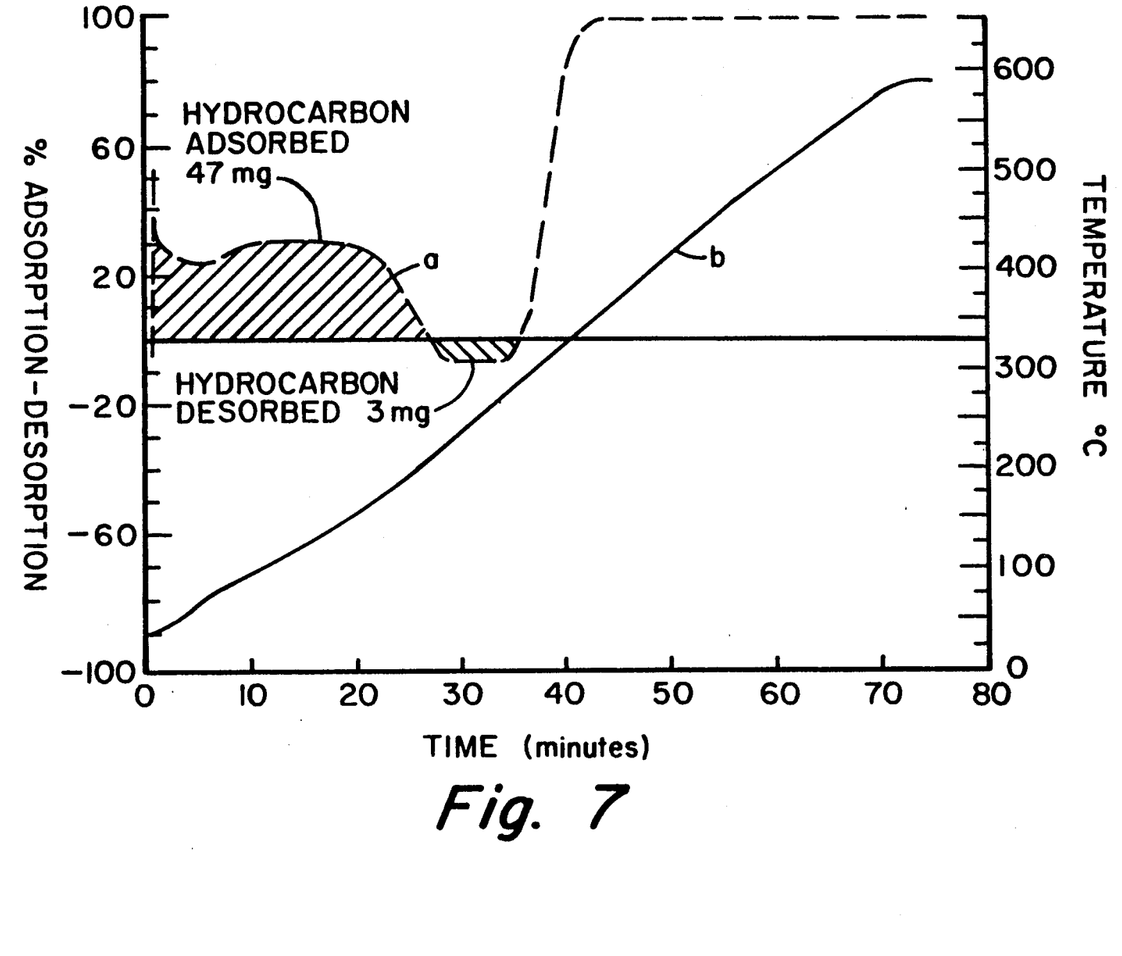
FIG. 7 is a plot of hydrocarbon adsorption-desorption pattern of a propylene-containing gas mixture versus time and temperature, with an apparatus having filled cells as in FIG. 6, and in which the open cells are coated with a three-way catalyst.

Inventive example showing three-way catalyst coating the open cells in addition to zeolite adsorbing agent in the loaded cells In this second sample, a zeolite loaded in alternate channels of honeycomb body from Example 1 was catalyzed by washcoating $Pt/Al_2O_3/CeO_2$ in the open channels. Nearly 26% by weight of $Pt/Al_2O_3/CeO_2$ based on the zeolite-loaded honeycomb was loaded on the sample. The Pt loading was about 28 g/ft$^3$ (about 1 g/l) of the honeycomb. This sample was then tested for hydrocarbon adsorption and desorption as in Example 1. The hydrocarbon conversion and temperature data were plotted as a function of time and shown as FIG. 7. A total of about 47 mg of hydrocarbon was adsorbed and of that 47 mg, about 3 mg was desorbed (about 6% was desorbed). Therefore, the 94% that was not desorbed was most likely decomposed by some cracking, or oxidation.

EXAMPLE 3

Inventive example of Engine dynamometer test

Samples were prepared similarly as explained in Example 2. Ceramic substrate size: about 4" (about 10 cm) diameter by about 3.5" (about 8.9 cm) length, about 15 cells/cm$^2$ (about 100 cells/in$^2$), about 0.012" (about 0.03 cm) wall thickness, and wall porosity with an average pore diameter of about 13μ. Approximately 200 g/liter zeolite (ZSM-5 $SiO_2/Al_2O_3$ mole ratio of about 30) and about 30 g/liter binder were loaded in alternate channels. About 100 g/liter of three-way catalyst was coated on the walls of open channels. Noble metal loading was about 35 g Pt/ft3 of the honeycomb (about 1.24 g/liter) and about 5 g Rh/ft$^3$ of the honeycomb, (about 0.18 g/liter). Two each samples were packed in series in a can for adsorption and desorption tests with an engine dynamometer. In these tests the sample was mounted in a position ready to receive the exhaust gas. Hydrocarbon concentration and flow rate were then set to about 2500 vol. ppmC (parts per million of carbon) and about 0.6 standard cubic meters per minute, respectively. Also, gas temperature was maintained at about 150° C. using a heat exchanger in the exhaust system. After the hydrocarbon analyzer was set up, the flow gas was switched to the sample line. The following was continuously recorded: time into test, inlet hydrocarbon ppmC, outlet hydrocarbon ppmC, inlet flow rate, inlet gas temperature, outlet gas temperature, and inlet pressure. After about 5 minutes, the adsorption cycle was stopped and the exhaust gas from the test section was diverted to the atmosphere, the engine conditions were adjusted for the desorption cycle, an exhaust flow of about 2.5 standard cubic meters per minute, temperature to about 425° C., and hydrocarbon concentration to about 150 ppmC. The desorption cycle was then started by switching the exhaust flow to the test section and continuing for about 5 minutes. The same data was continuously recorded as mentioned earlier. The total hydrocarbon adsorbed and desorbed was calculated from the difference between inlet and outlet hydrocarbon concentrations. A total of about 0.55 g of hydrocarbons were adsorbed and of this 0.55 g only about 0.04 g were desorbed (about 92.7% of hydrocarbons were adsorbed-decomposed). This result is relatively consistent with the results of Example 2.

It should be understood that while the present invention has been described in detail with respect to certain illustrative embodiments thereof, it should not be considered limited to such but may be used in other ways without departing from the spirit of the invention and the scope of the appended claims.

What is claimed is:

1. An apparatus for modifying a gaseous mixture, the apparatus comprising:
    a) a unitary body having an inlet end, an outlet end, and a multiplicity of cells extending from inlet end to outlet end, the cells being separated from one another by porous walls; and
    b) filler material comprising electrically non-conducting active powder material, loading into some of the cells wherein at least 80% of the volume of each of the loaded cells is filled with said filler material, with the remaining cells having no said filler material and being open, wherein a gaseous mixture enters the body at the inlet end through the open cells, and at least some of the gaseous mixture passes through the porous walls and is compositionally modified by the active material, and thereafter the resultant modified mixture passes through the open cells and exits the body at the outlet end.

2. An apparatus of claim 1 wherein each of the loaded cells neighbors at least one open cell in a cross sectional plane.

3. An apparatus of claim 2 wherein the loaded cells alternate with the open cells in a cross sectional plane.

4. An apparatus of claim 1 wherein the active powder material is at least one type of material selected from catalyst material, and sorbing material.

5. An apparatus of claim 4 wherein the active powder material comprises sorbing material.

6. An apparatus of claim 5 wherein said sorbing material is at least one hydrocarbon adsorbing agent.

7. An apparatus of claim 6 wherein said sorbing material is selected from the group consisting of molecular sieve, activated carbon, and combinations thereof.

8. An apparatus of claim 7 wherein said molecular sieve is selected from the group consisting of zeolite, carbon molecular sieve, metallophosphates, aluminophosphates, silicoaluminophosphates, and combinations thereof.

9. An apparatus of claim 8 wherein said zeolite is selected from the group consisting of faujasite type, pentasil type, mordenite, beta, and combinations thereof.

10. An apparatus of claim 9 wherein said zeolite is selected from the group consisting of ultra stable Y, ZSM type, and combinations thereof.

11. An apparatus of claim 6 wherein the active powder material includes an oxidation catalyst for conversion of hydrocarbons.

12. An apparatus of claim 6 wherein at least some of the open cells are catalyzed with a three-way catalyst.

13. An apparatus of claim 4 wherein the active powder material comprises catalyst material.

14. An apparatus of claim 13 wherein the catalyst material comprises a selective reduction catalyst.

15. An apparatus of claim 1 wherein said unitary body is a honeycomb structure.

16. An apparatus of claim 1 wherein about 75% of the total number of cells of said body are filled with said active powder material, and about 25% of said total number of cells have no filler material and are open.

17. A device for modifying a gaseous mixture comprising:
   a) a first apparatus which comprises a unitary body having an inlet end, an outlet end, a multiplicity of cells extending from inlet end to outlet end, and filler material comprising electrically non-conducting active powder material loaded into some of the cells wherein at least 80% of the volume of each of the loaded cells is filled with said filler material, with the remaining cells having no said filler material and being open, wherein said gaseous mixture enters said first apparatus through the inlet end and is modified by the active materials to produce a modified mixture which thereafter exits the first apparatus at the outlet end; and
   b) a second apparatus loaded downstream of said first apparatus, and comprising a unitary body having an inlet end, an outlet end, and a multiplicity of cells extending from inlet end to outlet end, the second apparatus body having a catalyst, whereby the modified mixture exiting the first apparatus body, enters the second apparatus body at the inlet end and is further modified by the second apparatus catalyst to produce a further modified mixture, which thereafter exits the second apparatus at the outlet end.

18. A system of claim 17 wherein the active powder material is at least one type of material selected from catalyst material, and sorbing material.

19. A system of claim 18 wherein the active powder material is sorbing material.

20. A system of claim 19 wherein the sorbing material is at least one hydrocarbon adsorbing agent.

21. A system of claim 19 wherein the second apparatus catalyst is a three-way catalyst.

22. A system of claim 17 wherein said unitary bodies are honeycomb structures.

* * * * *